US008756299B2

(12) United States Patent
Kim et al.

(10) Patent No.: US 8,756,299 B2
(45) Date of Patent: Jun. 17, 2014

(54) UBIQUITOUS SENSOR NETWORK SYSTEM AND METHOD OF CONFIGURING THE SAME

(75) Inventors: Ki-Hyung Kim, Suwon-si (KR); Chae-Seong Lim, Anyang-si (KR); Jun-Sung Park, Dong-gu (KR)

(73) Assignee: Ajou University Industry—Academic Cooperation Foundation, Suwon-si, Gyeonggi-do (KR)

( * ) Notice: Subject to any disclaimer, the term of this patent is extended or adjusted under 35 U.S.C. 154(b) by 647 days.

(21) Appl. No.: 12/525,660

(22) PCT Filed: Jun. 13, 2007

(86) PCT No.: PCT/KR2007/002850
§ 371 (c)(1),
(2), (4) Date: Aug. 3, 2009

(87) PCT Pub. No.: WO2008/153232
PCT Pub. Date: Dec. 18, 2008

(65) Prior Publication Data
US 2010/0070618 A1    Mar. 18, 2010

(51) Int. Cl.
*G06F 15/177* (2006.01)
*H04W 84/18* (2009.01)
*H04W 40/00* (2009.01)
*H04L 12/28* (2006.01)
*H04L 29/08* (2006.01)
*H04L 12/24* (2006.01)

(52) U.S. Cl.
CPC .............. *H04W 84/18* (2013.01); *H04W 40/00* (2013.01); *H04L 2012/2841* (2013.01); *H04L 67/12* (2013.01); *H04L 41/12* (2013.01); *H04L 41/0813* (2013.01)
USPC ............................ 709/221; 713/100; 370/328

(58) Field of Classification Search
CPC ................. H04W 84/18; H04W 40/00; H04L 2012/2841; H04L 67/12; H04L 41/12; H04L 41/0813
USPC ............................ 709/221; 713/100; 370/328
See application file for complete search history.

(56) References Cited

U.S. PATENT DOCUMENTS

| 5,951,694 A * | 9/1999 | Choquier et al. ............... 714/15 |
| 2004/0075738 A1 * | 4/2004 | Burke et al. ................... 348/143 |

(Continued)

FOREIGN PATENT DOCUMENTS

| KR | 1020050108533 A | 11/2005 |
| WO | WO2006/068370 A1 | 6/2006 |

OTHER PUBLICATIONS

Li, et al.; Reactive Behavior in Self-reconfiguring Sensor networks; 2002; Mobile Computing and Communications Review, vol. 1, No. 2; 2 pages.*

(Continued)

*Primary Examiner* — Oleg Survillo
(74) *Attorney, Agent, or Firm* — Sherr & Jiang, PLLC

(57) ABSTRACT

In a ubiquitous sensor network (USN) system having a router and a sensor node connectable to a detachable memory device, a sensor network configuration information including a sensor network identification is received from the detachable memory device under control of the router. The sensor network configuration information including the sensor network identification is received from the detachable memory device under control of the sensor node. A sensor network is configured based on the sensor network identification under control of at least one of the router and the sensor node. Accordingly, the USN system may be automatically configured by using the detachable memory devices including the sensor network configuration information.

7 Claims, 7 Drawing Sheets

(56) References Cited

U.S. PATENT DOCUMENTS

| | | | |
|---|---|---|---|
| 2004/0170262 A1* | 9/2004 | Ohno | 379/167.12 |
| 2005/0143129 A1* | 6/2005 | Funk et al. | 455/560 |
| 2006/0143439 A1* | 6/2006 | Arumugam et al. | 713/153 |
| 2007/0133469 A1* | 6/2007 | Shin et al. | 370/331 |
| 2007/0270096 A1* | 11/2007 | Nozaki | 455/7 |
| 2008/0016440 A1* | 1/2008 | Liu et al. | 715/700 |
| 2008/0040509 A1* | 2/2008 | Werb et al. | 709/242 |
| 2008/0094205 A1* | 4/2008 | Thorn | 340/539.1 |
| 2008/0288615 A1* | 11/2008 | Bajwa et al. | 709/220 |
| 2009/0168747 A1* | 7/2009 | Kimura | 370/350 |
| 2010/0219250 A1* | 9/2010 | Wang | 235/462.43 |
| 2011/0019621 A1* | 1/2011 | Funk et al. | 370/328 |
| 2011/0090041 A1* | 4/2011 | Naden et al. | 340/3.1 |
| 2011/0320050 A1* | 12/2011 | Petite et al. | 700/284 |

OTHER PUBLICATIONS

MEA 3.1 Mesh Sensor Network Configuration Guide, Document Revision 3.1.8; 2005; Motorola; pp. 1-49.*

Balani, et al.; Multi-level Software Reconfiguration for Sensor Networks; Oct. 2006; University of California at Los Angeles; EMSOFT'06, ACM; pp. 1-10.*

Reich, et al.; Toward Automatic Reconfiguration of Robot-Sensor Networks for Urban Search and Rescue; 2006; Columbia University; ACM; pp. 1-6.*

Kansal, et al.; Reconfiguration Methods for Mobile Sensor Networks; Oct. 2007; University of California Los Angeles; ACM Trans. Sens. Netw. 3, 4, Article 22; pp. 1-28.*

* cited by examiner

UBIQUITOUS SENSOR NETWORK SYSTEM AND METHOD OF CONFIGURING THE SAME

CROSS REFERENCE TO PRIOR APPLICATION

The present application is a National Stage Application of PCT International Application No. PCT/KR2007/002850 (filed on Jun. 13, 2007), under U.S.C. 371, which is hereby incorporated by reference in its entirety.

TECHNICAL FIELD

The present invention relates to a sensor network, and more particularly to a ubiquitous network system and a method of configuring the ubiquitous network system.

BACKGROUND ART

In general, a ubiquitous sensor network is a network in which small elements such as sensor nodes of all sorts are configured to wirelessly receive data. For example, a node of a sensor network may include a sensor, a control unit, and a data transmission unit. The sensor may include a temperature sensor, a crime prevention sensor, and a fingerprint sensor. The control unit may include an alarm device, an opening and shutting control device for a sliding window, and an electric lamp control unit. The data transmission unit may include a camera that transmits pictures or videos.

For a normal operation of the ubiquitous sensor network, a user (an administrator) has to set characteristics of the nodes such as sensor nodes or a server included in the ubiquitous sensor network. For example, when the node corresponds to a temperature sensor node, the user (the administrator) may set a maximum or a minimum critical value of the temperature sensor node, a network path for transmitting temperature data, and/or information about a server.

When the user (the administrator) manually connects the nodes and sets the characteristics of each node, a considerable setting time is required.

DISCLOSURE OF THE INVENTION

Technical Problem

The present invention is provided to solve the problems mentioned above. The present invention provides a ubiquitous network system that may be automatically configured by using a detachable memory device including sensor network configuration information.

In addition, the present invention provides a method of configuring the ubiquitous network system.

Technical Solution

In a ubiquitous sensor network (USN) system having a router and a sensor node connectable to a detachable memory device, according to the method of configuring the USN system, a sensor network configuration information including a sensor network identification is received from the detachable memory device under control of the router (step (a)). The sensor network configuration information including a sensor network identification is received from the detachable memory device under control of the sensor node (step (b)). A sensor network is configured based on the sensor network identification under control of at least one of the router and the sensor node (step (c)). For example, the sensor network identification may correspond to a unique serial number of the detachable memory device.

In the step (a), the sensor network configuration information further including a server information list may be received where the server information list includes information on servers connectable to the sensor node, and a server network may be configured between the sensor node and a server communicating with the sensor node based on the server information list.

In the step (a), the sensor network configuration information further including a sensor node information list may be received where the sensor node information list includes information of the sensor node configuring the sensor network. In this case, in the step (c), the router may be connected to the sensor node based on the sensor network identification under control of the sensor node, and the sensor network may be reconfigured based on the sensor node information under control of the router.

In the step (b), the sensor network configuration information further including a server information list may be received where the server information list includes information on servers connectable to the sensor node, and a server network may be configured between the sensor nodes and a server communicating with the sensor node based on the server information list.

In the step (a), the sensor network configuration information further including a sensor node information list may be received where the sensor node information list includes information of the sensor node configuring the sensor network. In the step (c), the router may be connected to the sensor node based on the sensor network identification under control of the sensor node, and the sensor network may be reconfigured based on the sensor node information under control of the router.

In the step (a), the sensor network configuration information further including a sensor node information list may be received where sensor node information list includes information of the sensor node configuring the sensor network. In the step (c), the router may be connected to the sensor node based on the sensor network identification under control of the sensor node, and the sensor network may be reconfigured based on the sensor node information under control of the router.

The USN system may further (d) customize the USN system.

In some example embodiments of the present invention, a USN system includes at least one sensor node, and a router. The sensor node receives sensor network configuration information including a sensor network identification from a detachable memory device, where the sensor node is connectable to the detachable memory device. The router receives sensor network configuration information including the sensor network identification, where the router is connectable to the detachable memory device. The sensor node and the router configure a sensor network based on the sensor network identification. For example, the sensor network identification may correspond to a unique serial number of the detachable memory device.

The USN system may further include a server. The sensor network configuration information may further include a server information list which includes information on servers connectable to the sensor node. At least one of the router and the sensor node configures a server network which means a network between the sensor node and a server based on the server information list. For example, the server may customize the USN system.

The sensor network configuration information may further include a sensor node information list. The sensor node information list includes information of the sensor node configuring the sensor network. When the sensor node is connected to the router based on the sensor network identification, the router may reconfigure the sensor network based on the sensor node information list.

Advantageous Effects

According to the present invention, the ubiquitous sensor network (USN) system may be automatically configured by using the detachable memory devices including the sensor network configuration information.

Further, the USN system may be reconfigured by using the server information list and/or the sensor node information list included in the sensor network configuration information.

REFERENCE NUMERALS OF IMPORTANT ELEMENTS

Figure 1:
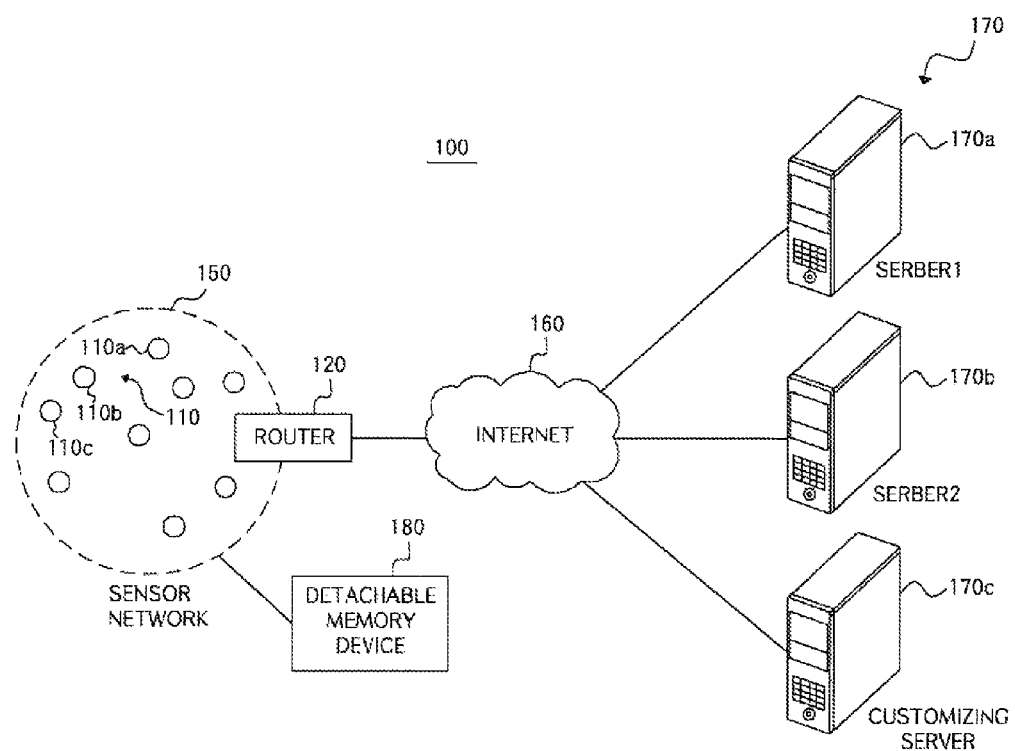
FIG. 1 is a diagram illustrating a ubiquitous network system according to an example embodiment of the present invention.

100: ubiquitous nelwork system
150: sensor network
120: router
170: server
110: sensor node
160: Internet

BEST MODE FOR CARRYING OUT THE INVENTION

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, the present invention will be described in detail with reference to the accompanying drawings.

FIG. 1 is a diagram illustrating a ubiquitous network system according to an example embodiment of the present invention.

Referring to FIG. 1, a ubiquitous network system 100 includes a sensor network 150, an internet 160, and a server 170. The sensor network 150 includes a sensor node 110 and a router 120.

The sensor node 110 means a sensor on the sensor network 150 and may be connected to a detachable memory device 180. For example, the sensor node 110 may include a temperature sensor node 110a, a crime prevention sensor node 110b, and a fingerprint sensor node 110c.

When the sensor node 110 transmits data to the server 170 or the server 170 transmits data to the sensor node 110, the router 120 is required. The router 120 may be connected to the detachable memory device 180. For example, the temperature sensor node 110a is connected with the server 170 through the router 120.

The internet 160 is a sort of communication networks, and the internet 160 is not limited to a network using internet protocols.

The server 170 receives data from the sensor node 110 or transmits data to the sensor node 110. For example, the server 170 receives temperature information from the temperature sensor node 110a, and the server 170 operates an air conditioner or a hitter, and sets a critical value of the temperature sensor node 110a based on the temperature information.

Hereinafter, data structures required in configuring the ubiquitous network system will be described referring to FIGS. 6 to 8.

Figure 6:
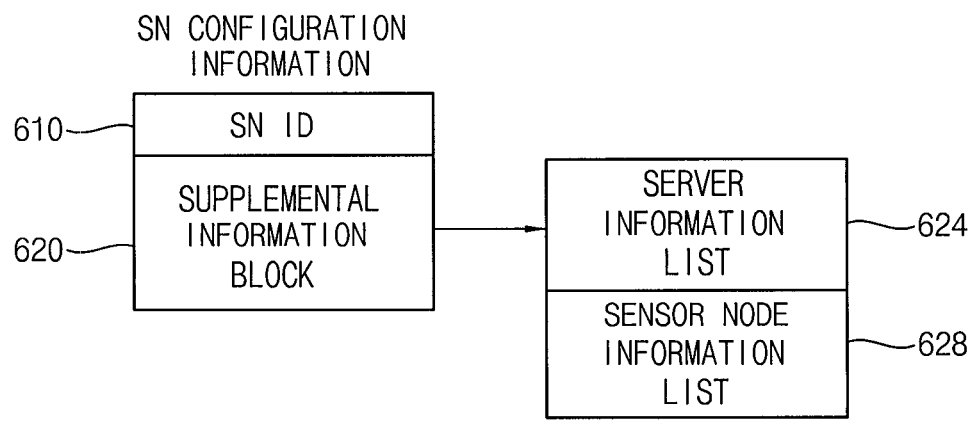
FIG. 6 is a diagram illustrating a data structure of sensor network configuration information required in configuring the ubiquitous network system.

FIG. 6 is a diagram illustrating a data structure of sensor network configuration information required in configuring the ubiquitous network system.

The sensor network configuration information corresponds to the data required in automatically configuring the ubiquitous network system, and the sensor network configuration information is stored in the detachable memory device. That is, the sensor network configuration information 600 includes a sensor network identification 610 which is an identifier of a sensor network. The sensor network configuration information 600 may further include a supplemental information block 620 which contains server information needed for the sensor node 110 and/or network security information for a sensor network security.

For example, the sensor network identification 610 may correspond to a unique serial number of the detachable memory device, and the supplemental information block 620 may include a server information list 624 and a sensor node information list 628. The server information list 624 is needed for server information for the sensor node 110 and the sensor node information list 628 is needed for the sensor network security.

Figure 7:
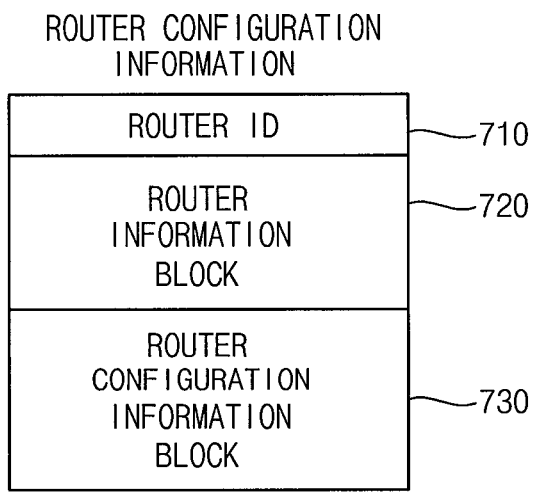
FIG. 7 is a block diagram illustrating a data structure of router configuration information required in configuring the ubiquitous network system.

FIG. 7 is a block diagram illustrating a data structure of router configuration information required in configuring the ubiquitous network system.

The router configuration information 700 may include a router identification 710, a router information block 720, and a router configuration information block 730. The router identification 710 is an identifier of the router 120. The router information block 720 is information on the router 120. The router configuration information block 730 stores a required portion of the sensor network configuration information 600. The router configuration information block 730 may be used for correcting the sensor network configuration information 600 as needed.

For example, the router configuration information block 730 may include the sensor network identification 610, and may further include the supplemental information block 620 which contains server information needed for the sensor node 110 and/or network security information for a sensor network security.

Figure 8:
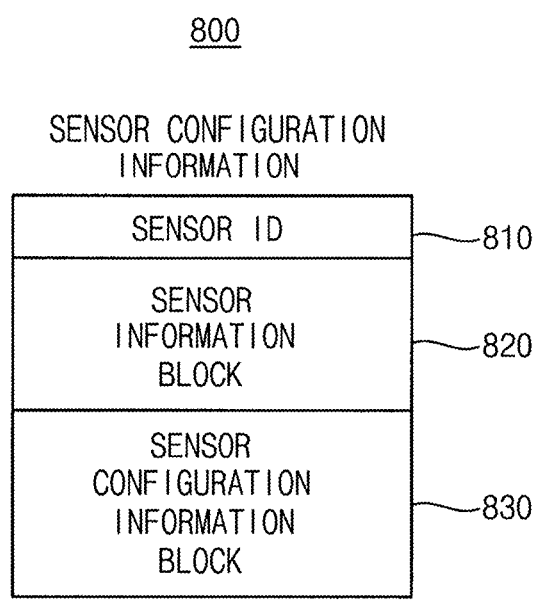
FIG. 8 is a block diagram illustrating a data structure of sensor node configuration information required in configuring the ubiquitous network system.

FIG. 8 is a block diagram illustrating a data structure of sensor node configuration information required in configuring the ubiquitous network system.

The sensor node configuration information 800 includes a sensor identification 810, a sensor information block 820, and a sensor configuration information block 830. The sensor identification 810 is an identifier of the sensor node 110. The sensor information block 820 is information on the sensor, for example, functions of the sensor. The sensor configuration information block 830 stores a required portion of the sensor network configuration information 600.

For example, the sensor configuration information block 830 may include the sensor network identification 610, and may further include the supplemental information block 620 which contains server information needed for the sensor node 110 and/or network security information needed for a sensor network security as needed.

Hereinafter, a method of configuring the ubiquitous network system will be described referring to FIGS. 2 to 5.

Figure 2:
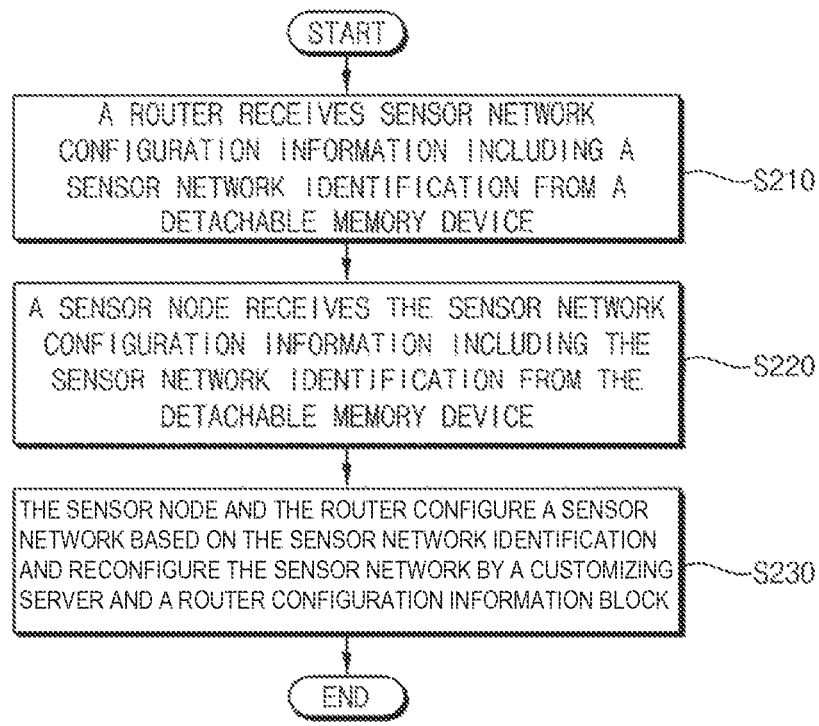
FIG. 2 is a diagram illustrating a method of configuring a ubiquitous network system according to a first example embodiment of the present invention.

FIG. 2 is a diagram illustrating a method of configuring a ubiquitous network system according to a first example embodiment of the present invention.

A router 120 receives sensor network configuration information including a sensor network identification 610 from a detachable memory device (step S210).

A sensor node 110 receives the sensor network configuration information including the sensor network identification 610 from the detachable memory device (step S220).

The sensor node 110 and the router 120 configure a sensor network based on the sensor network identification 610 (step S230). That is, the sensor node 110 is connected to the router 120 based on the sensor network identification 610 of itself, and the router 120 is connected to the sensor node 110 based on the sensor network identification 610 of itself.

A server 170, for example, a customizing server 170c, may customize the ubiquitous network system. For example, the server 170 may check the information or status of the sensor node 110, which are registered in the router 120.

Accordingly, the ubiquitous network system may be automatically configured by using the detachable memory device which includes the sensor network configuration information.

Figure 3:
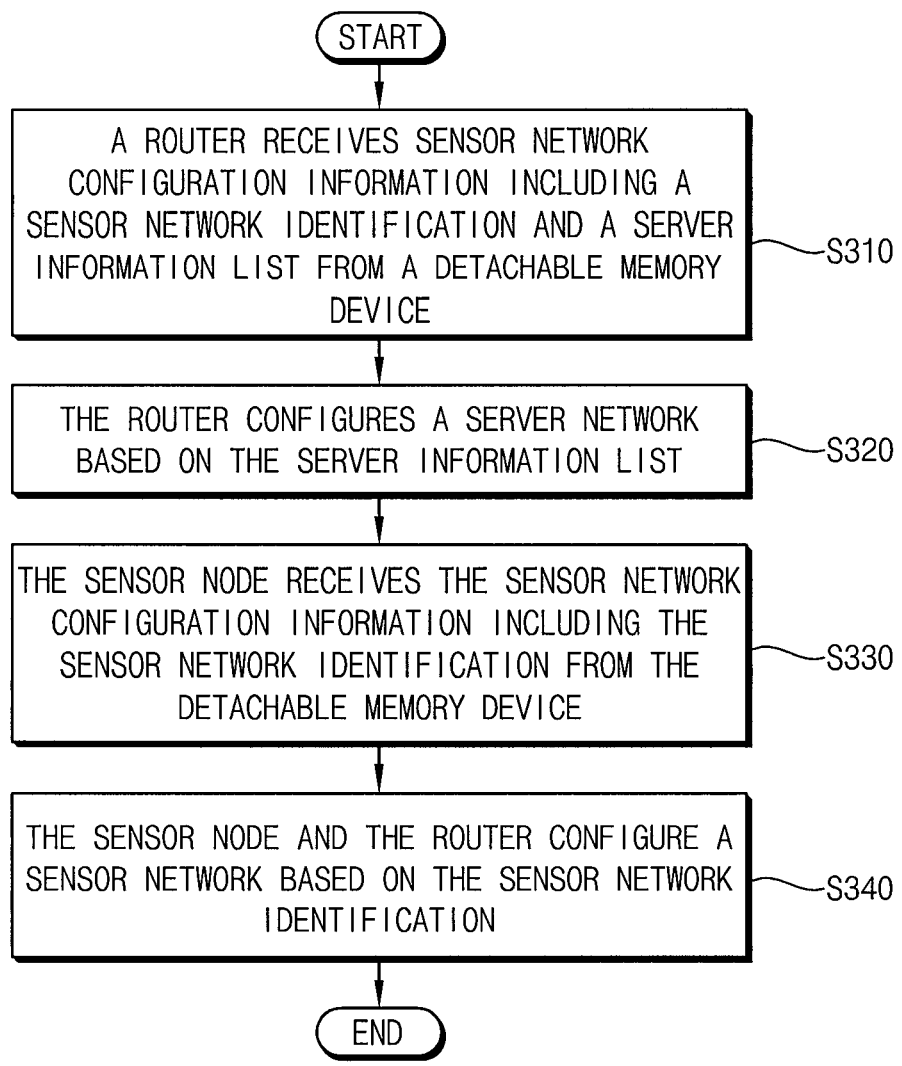
FIG. 3 is a diagram illustrating a method of configuring a ubiquitous network system according to a second example embodiment of the present invention.

FIG. 3 is a diagram illustrating a method of configuring a ubiquitous network system according to a second example embodiment of the present invention.

A router 120 receives sensor network configuration information including a sensor network identification 610 and a server information list 624 from a detachable memory device (step S310).

The router 120 configures a server network based on the server information list 624 (step S320). The server network means a network between a sensor node 110 and a server which communicates with the sensor node 110. For example, the router 120 receives the data from the sensor node 110a and transmits the data to a determined server 170a. The server 170a is determined based on functions of the sensor node 110a.

The sensor node 110 receives the sensor network configuration information including the sensor network identification 610 from the detachable memory device (step S330).

The sensor node 110 and the router 120 configure a sensor network based on the sensor network identification 610 (step S340). That is, the sensor node 110 is connected to the router 120 based on the sensor network identification 610 of itself, and the router 120 is connected to the sensor node 110 based on the sensor network identification 610 of itself.

A server 170, for example, a customizing server 170c, may customize the ubiquitous network system. For example, the server 170 may check the information or status of the sensor node 110 registered in the router 120.

Consequently, the ubiquitous network system may be automatically configured by using the detachable memory devices including the sensor network configuration information.

Figure 4:
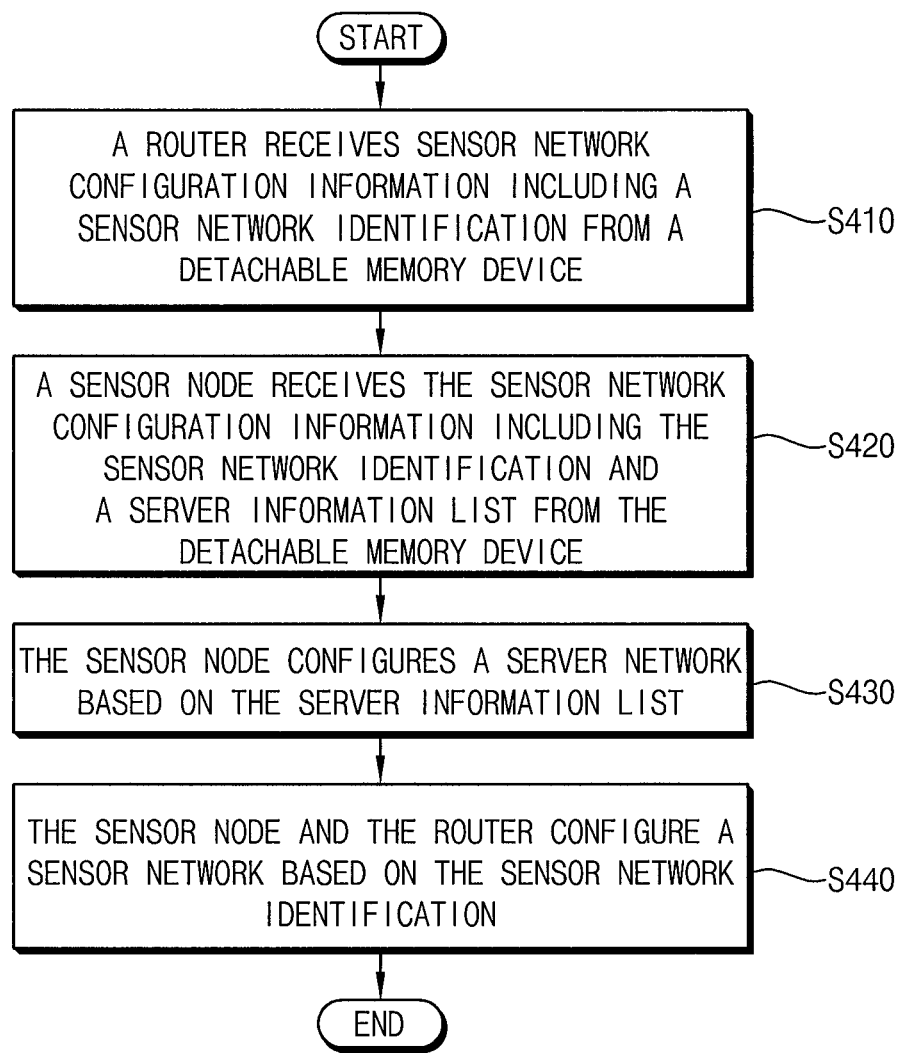
FIG. 4 is a diagram illustrating a method of configuring a ubiquitous network system according to a third example embodiment of the present invention.

FIG. 4 is a diagram illustrating a method of configuring a ubiquitous network system according to a third example embodiment of the present invention.

A router 120 receives sensor network configuration information including a sensor network identification 610 from a detachable memory device (step S410).

A sensor node 110 receives the sensor network configuration information including the sensor network identification 610 and a server information list 624 from the detachable memory device (step S420).

The sensor node 110 configures a server network based on the server information list 624 (step S430). The server network means a network between a sensor node 110 and a server which communicates with the sensor node 110. For example, the sensor node 110 determines an appropriate server 170a based on its own functions and transmits data to the determined server 170a.

The sensor node 110 and the router 120 configure a sensor network based on the sensor network identification 610 (step S440). That is, the sensor node 110 is connected to the router 120 based on the sensor network identification 610 of itself, and the router 120 is connected to the sensor node 110 based on the sensor network identification 610 of itself.

A server 170, for example, a customizing server 170c, may customize the ubiquitous network system. For example, the server 170 may check the information or status of the sensor node 110 registered in the router 120.

Consequently, the ubiquitous network system may be automatically configured by using the detachable memory devices including the sensor network configuration information.

Figure 5:
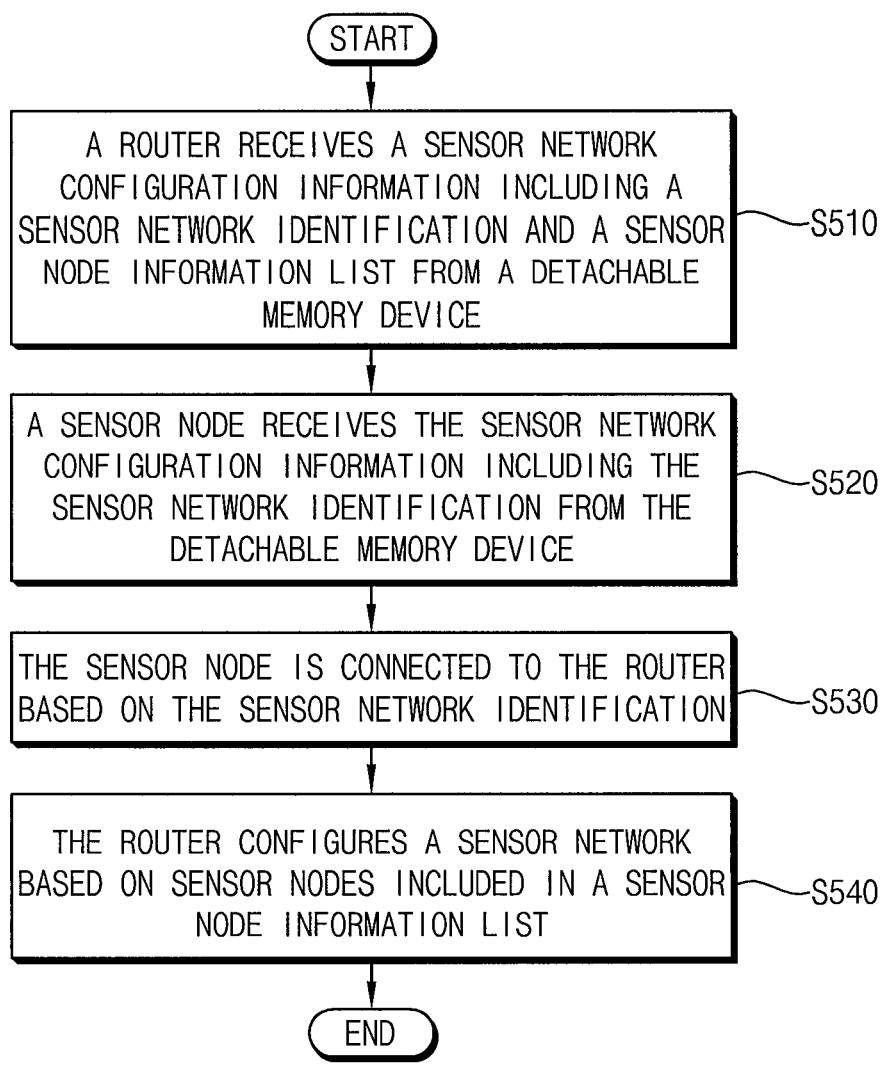
FIG. 5 is a diagram illustrating a method of configuring a ubiquitous network system according to a fourth example embodiment of the present invention.

FIG. 5 is a diagram illustrating a method of configuring a ubiquitous network system according to a fourth example embodiment of the present invention.

A router 120 receives a sensor network configuration information including a sensor network identification 610 and a sensor node information list 628 from a detachable memory device (step S510).

A sensor node 110 receives the sensor network configuration information including the sensor network identification 610 from the detachable memory device (step S520).

The sensor node 110 and the router 120 configure a sensor network based on the sensor network identification 610. That is, the sensor node 110 is connected to the router 120 based on the sensor network identification 610 (step S530), and the router 120 configures a sensor network 150 based on the sensor node information list 628 (step S540). For example, the sensor node information list 628 may be used for a security of the sensor network 150.

Accordingly, the sensor network 150 may be configured based on the sensor node 110 and the router 120 included in the sensor node information list 628.

Consequently, the ubiquitous network system may be automatically configured by using the detachable memory devices including the sensor network configuration information.

INDUSTRIAL APPLICABILITY

The ubiquitous network system may be automatically configured by using the detachable memory devices according to example embodiments of the present invention. The ubiquitous network system may be reconfigured by using the server information list and/or the sensor node information list included in the sensor network configuration information according to example embodiments of the present invention.

Having described the example of the present invention and its advantages, it is noted that various changes, substitutions and alterations can be made herein without departing from the spirit and scope of the invention as defined by appended claims.

What is claimed is:

1. A method of configuring a ubiquitous sensor network (USN) system having a router and a sensor node connectable to a detachable memory device, the method comprising:
   (a) receiving, at the router, a sensor network configuration information from the detachable memory device,
      the sensor network configuration information including a sensor network identification, a server information list and a sensor node information list, the server information list including information on servers that are connectable to the sensor node, and the sensor node information list including information on sensor nodes that are included in the ubiquitous sensor network and are capable of configuring the sensor network;
   (b) receiving, at the sensor node, the sensor network configuration information from the detachable memory device;
   (c) configuring, by at least one of the router and the sensor node, the sensor network by connecting the sensor node and the router to each other based on the sensor network identification, wherein the sensor network is automatically configured, based on the server information list, by coupling the sensor node to a server selected from the server information list when the sensor network configuration information is received from the detachable memory device by at least one of the router and the sensor node; and
   (d) reconfiguring the sensor network configured in step (c) by using at least one of the server information list and the sensor node information list, the reconfiguring comprising i) customizing the sensor network by a customizing server from the server information list via checking information or status of the sensor node being registered by the router and coupling of the router to the sensor node and ii) correcting the sensor network configuration information by a router configuration information block having the sensor network identification.

2. The method of claim 1, wherein the sensor node and the selected server are communicating via the Internet.

3. The method of claim 1, wherein the sensor network identification corresponds to a unique serial number of the detachable memory device.

4. A ubiquitous sensor network (USN) system comprising:
   at least one sensor node configured to receive a sensor network configuration information from a detachable memory device connectable to the sensor node, the sensor network configuration information including a sensor network identification,
      a server information list and a sensor node information list, the server information list including information on servers that are connectable to the sensor node, and the sensor node information list including information on sensor nodes that are included in the ubiquitous sensor network and are capable of configuring the sensor network; and
   a router configured to receive the sensor network configuration information including the sensor network identification from the detachable memory device, the router being connectable to the detachable memory device,
   wherein the sensor node and the router connects to each other to configure the sensor network based on the sensor network identification, wherein the sensor network is automatically configured, based on the server information list, by coupling the sensor node to a server selected from the server information list when at least one of the sensor node and the router receives the sensor network configuration information from the detachable memory device, wherein the sensor network is reconfigured by i) a customizing server from the server information list, which customizes the sensor network via checking information or status of the sensor node being registered by the router and coupling of the router to the sensor node and ii) a router configuration information block having the sensor network identification which corrects the sensor network configuration information based on using at least one of the server information list and the sensor node information list.

5. The USN system of claim 4, wherein the selected server is the customizing server.

6. The USN system of claim 4, wherein the sensor node and the selected server are communicating via the Internet.

7. The USN system of claim 4, wherein the sensor network identification corresponds to a unique serial number of the detachable memory device.

* * * * *